United States Patent
Su et al.

(10) Patent No.: US 11,940,658 B2
(45) Date of Patent: Mar. 26, 2024

(54) OPTICAL FIBER MODULE HAVING AN OPTICAL FIBER BUNDLE WITH A TAPERED END AND MANUFACTURING METHOD THEREOF

(71) Applicant: INDUSTRIAL TECHNOLOGY RESEARCH INSTITUTE, Hsinchu (TW)

(72) Inventors: Hsin-Chia Su, Hsinchu (TW); Ying-Hui Yang, Hsinchu (TW); Yu-Cheng Song, Hsinchu (TW); Tsung-Jun Ho, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/558,656

(22) Filed: Dec. 22, 2021

(65) Prior Publication Data
US 2023/0136582 A1  May 4, 2023

(30) Foreign Application Priority Data
Oct. 29, 2021  (TW) ................. 110140441

(51) Int. Cl.
*G02B 6/42* (2006.01)
*G01J 1/04* (2006.01)

(52) U.S. Cl.
CPC .......... *G02B 6/4206* (2013.01); *G01J 1/0425* (2013.01)

(58) Field of Classification Search
CPC .... G02B 6/4206; G01J 1/0425; G01D 11/245
(Continued)

(56) References Cited

U.S. PATENT DOCUMENTS

| 7,773,640 B2 | 8/2010 | Hu et al. |
| 8,098,438 B2 | 1/2012 | Starodubov et al. |

(Continued)

FOREIGN PATENT DOCUMENTS

| CN | 1782756 | 6/2006 |
| CN | 100456066 | 1/2009 |

(Continued)

OTHER PUBLICATIONS

Taiwanese Office Action for Taiwanese Patent Application No. 110140441 dated Apr. 11, 2022.
(Continued)

*Primary Examiner* — Thanh Luu
*Assistant Examiner* — Mai Thi Ngoc Tran
(74) *Attorney, Agent, or Firm* — Amin, Turocy & Watson, LLP

(57) ABSTRACT

An optical fiber module is provided and includes an optical fiber structure, a light-absorbing area and a photoelectric sensor in a housing. The optical fiber structure collectively arranges a plurality of first optical fibers to form at least one optical fiber bundle with a tapered end, and a second optical fiber is connected to the tapered end of the optical fiber bundle to converge the optical fiber bundle to the second optical fiber. The light-absorbing area corresponds to an end of the second optical fiber, such that the light-absorbing area absorbs scattering signals escaped and scattered when signals are transmitted from the plurality of first optical fibers to the second optical fiber. The photoelectric sensor is arranged corresponding to the plurality of first optical fibers to receive target signals escaped and refracted when the signals are transmitted from the second optical fiber to the plurality of first optical fibers.

6 Claims, 7 Drawing Sheets

(58) Field of Classification Search
USPC .......................... 250/227.11, 227.14, 227.28
See application file for complete search history.

(56) References Cited

U.S. PATENT DOCUMENTS

| | | |
|---|---|---|
| 9,268,095 B2 | 2/2016 | Shamir et al. |
| 10,310,201 B2 | 6/2019 | Kliner |
| 10,901,162 B2 | 1/2021 | Kliner |
| 2014/0249407 A1 | 9/2014 | Adler et al. |
| 2015/0049983 A1 | 2/2015 | Fisher et al. |
| 2017/0153400 A1* | 6/2017 | Kasai .................... H01S 5/0071 |
| 2019/0000549 A1 | 1/2019 | Griffin et al. |
| 2021/0181015 A1* | 6/2021 | Sakamoto ............. G01J 1/4228 |
| 2022/0373873 A1* | 11/2022 | Lin .................... G03B 21/2066 |

FOREIGN PATENT DOCUMENTS

| | | |
|---|---|---|
| CN | 102646925 A | 8/2012 |
| CN | 202475426 | 10/2012 |
| CN | 105026969 | 11/2015 |
| CN | 105026971 | 11/2015 |
| CN | 102646925 B | 2/2016 |
| CN | 106461880 | 5/2018 |
| CN | 112179535 | 1/2021 |
| JP | 5888775 | 3/2016 |
| TW | I230811 | 4/2005 |
| TW | 201000951 | 1/2010 |
| TW | I337267 | 2/2011 |
| TW | 201213898 | 4/2012 |
| TW | I380542 | 12/2012 |
| TW | I448753 | 8/2014 |
| TW | I659583 | 5/2019 |
| TW | I667853 | 8/2019 |

OTHER PUBLICATIONS

Garavaglia, et al. "Process development and coaxial sensing in fiber laser welding of 5754 Al-alloy", Journal of Laser Applications; 2019; 31, 022419.

Petrovskiy, et al. "Detection of radiation of powerful fiber lasers reflected back from metals in course of laser processing", Laser Physics Letters; May 2010; 7(5): 396-400.

Harrison, et al. "Using the analysis of laser-based back-reflected light to improve piercing and cutting performance for high power fiber lasers", ICALEO; 2017; 601(2017).

* cited by examiner

OPTICAL FIBER MODULE HAVING AN OPTICAL FIBER BUNDLE WITH A TAPERED END AND MANUFACTURING METHOD THEREOF

CROSS-REFERENCE TO RELATED APPLICATIONS

This Application claims priority to Taiwan Patent Application No. 110140441, filed on Oct. 29, 2021. The entirety of the above-mentioned patent application is hereby incorporated by reference herein and made a part of this specification.

BACKGROUND

1. Technical Field

The present disclosure relates to an optical fiber structure, and more particularly, to a multifunctional optical fiber module and a manufacturing method thereof.

2. Description of Related Art

In recent years, lasers have been widely used in various processing operations. As the demand for processing diversification and processing thickness increases, the power of lasers has become higher and higher. One of the ways to increase laser power is to combine multiple laser beams with an optical-fiber light-collecting element, and then output them from a single optical fiber. This method can achieve the light collection effect and ensure that the lasers from different sources are coaxial.

The general direct diode laser (DDL) type configuration is to connect multiple optical fiber lasers to an output beam coupler by optical fibers, and the output beam coupler outputs the laser light by one transmission optical fiber.

When processing objects, it is most feared that the reflected light will be reflected back to the original optical path system along the laser optical axis. This situation is likely to cause damage to the laser system, especially the excitation source at the input end is most likely to be damaged by the reflected light, and the cost of the excitation source usually accounts for more than 50% of the overall cost of the laser machine.

However, in general laser machines, the light-collecting element can only be used to combine laser sources from multiple sources on a single optical fiber axis for transmission. Therefore, the output beam coupler can only be used for light combining. An additional optical system (such as a reflected light detection optical path or an optical-fiber filter element) is required to perform the operation of determining the reflected light, so as to detect the reflected power at the laser output end, as a mechanism to protect the laser source.

However, the general method of adding optical elements will reduce the transmission efficiency of the laser, increase the cost of the laser, and cannot accurately determine the magnitude of the reflected light power actually reflected back to the emission source, resulting in misjudgment of the monitoring. Therefore, how to overcome the various problems of the prior art has become a problem that the industry urgently needs to overcome.

SUMMARY

In view of the above-mentioned problems of the prior art, the present disclosure provides an optical fiber module, which comprises: a plurality of first optical fibers collectively arranged to form at least one optical fiber bundle with a tapered end; a second optical fiber connected to the tapered end of the optical fiber bundle to converge the optical fiber bundle to the second optical fiber; a housing accommodating the optical fiber bundle with the tapered end and the second optical fiber and having a light-absorbing area corresponding to an end of the second optical fiber, wherein the second optical fiber is located between the optical fiber bundle and the light-absorbing area, and the light-absorbing area absorbs scattering signals escaped and scattered when signals are transmitted from the plurality of first optical fibers to the second optical fiber; and a photoelectric sensor configured corresponding to the optical fiber bundle with the tapered end and arranged in the housing, wherein the photoelectric sensor receives target signals escaped and refracted when the signals are transmitted from the second optical fiber to the plurality of first optical fibers.

The present disclosure further provides a manufacturing method of an optical fiber module, the manufacturing method comprises: performing a pre-cleaning discharge modulation operation to clean up surfaces of a plurality of first optical fibers; performing step discharge to swing and taper the plurality of first optical fibers to form at least one optical fiber bundle with a tapered end; performing periodic discharge to increase structural strength of the optical fiber bundle after tapering; and connecting a second optical fiber to the tapered end of the optical fiber bundle.

It can be seen from the above that the optical fiber module according to the present disclosure and the manufacturing method thereof integrate a photoelectric sensor and an optical fiber structure (i.e., an optical fiber bundle and a second optical fiber) into a housing to form a laser light-collecting element (i.e., the optical fiber module) with a built-in reflected power detection function (i.e., the photoelectric sensor). As compared with the prior art, the present disclosure not only has the efficiency of multi-beam laser combining light, but also can simultaneously capture and detect the reflected power signal inside it.

BRIEF DESCRIPTION OF THE DRAWINGS

FIG. 1A-2 is a schematic configuration view of an additional optical system of FIG. 1A-1.

FIG. 1A-3 is another schematic configuration view of an additional optical system of FIG. 1A-1.

FIG. 2B-1 is a schematic three-dimensional view of an optical fiber structure of an optical fiber module according to the present disclosure.

FIG. 2B-2 is a schematic cross-sectional view of an optical fiber bundle of FIG. 2B-1 at a connection point.

FIG. 2B-3 is a schematic cross-sectional view of a second optical fiber of FIG. 2B-1 at the connection point.

FIG. 3 is a schematic side perspective view of an optical fiber module according to the present disclosure in operation.

DETAILED DESCRIPTIONS

The following describes the implementation of the present disclosure with examples. Those familiar with the art can easily understand the other advantages and effects of the present disclosure from the content disclosed in this specification.

It should be understood that, the structures, ratios, sizes, and the like in the accompanying figures are used to illustrate the content disclosed in the present disclosure for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present disclosure. Meanwhile, terms such as "upper," "first," "second" and the like used herein are merely used for clear explanation rather than limiting practical range by the present disclosure, and thus, the alteration or adjustment of relative relationship thereof without altering the technical content should be considered in the practical scope of the present disclosure.

Figures 1, 1A:
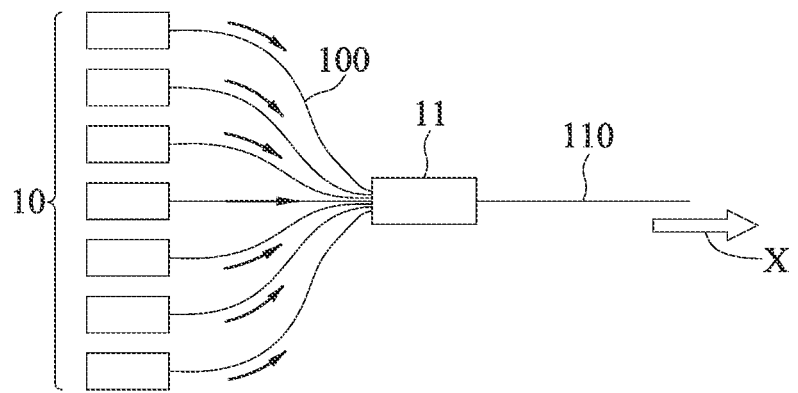
FIG. 1A-1 is a schematic configuration view of a general direct diode laser type.

As shown in FIG. 1A-1, a general direct diode laser (DDL) type configuration is to connect a plurality of optical fiber lasers 10 to an output beam coupler 11 by optical fibers 100, and the output beam coupler 11 outputs the laser light through a transmission optical fiber 110 (e.g., transmission direction X shown in FIG. 1A-1).

Figures 1, 1A, 2:
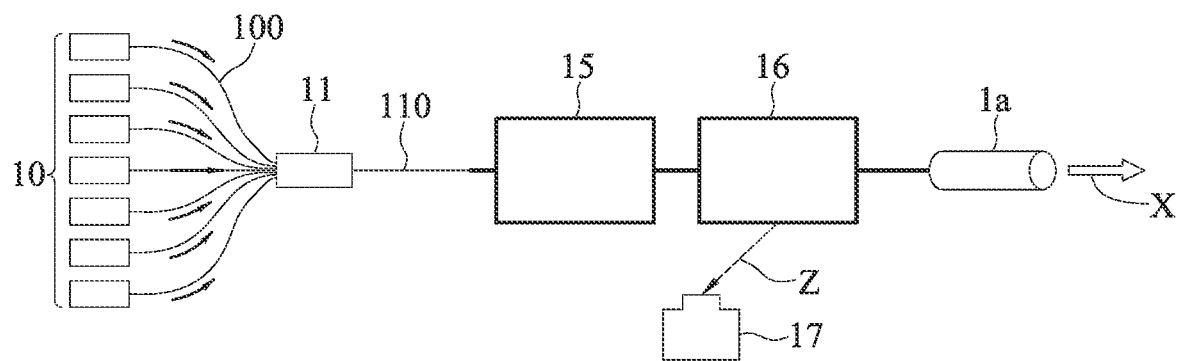
Figures 1, 1A, 2, 3:
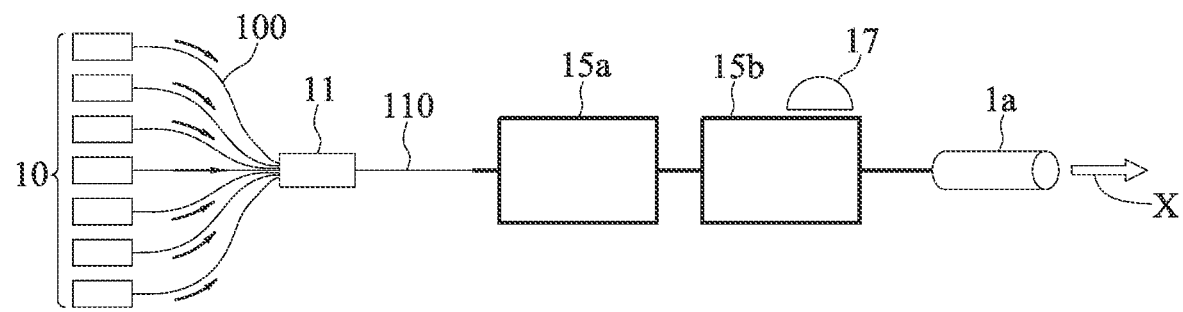
Figure 1B:
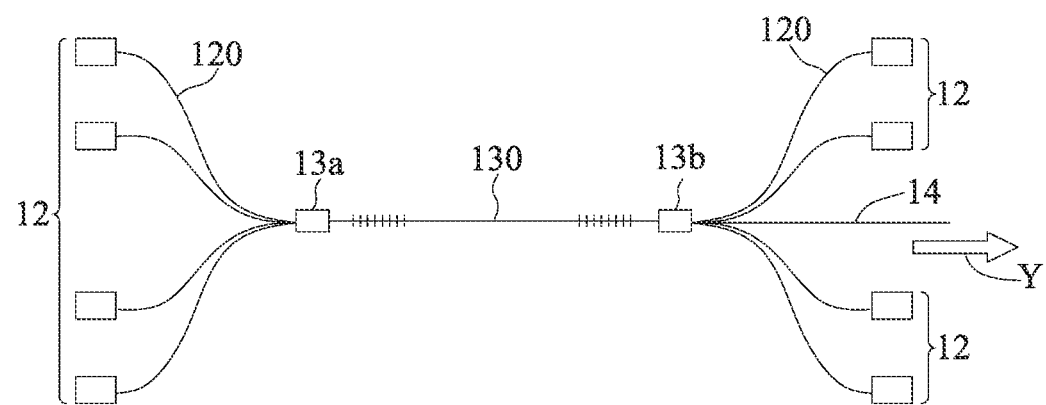
FIG. 1B is a schematic configuration view of a general optical fiber laser type.

Alternatively, as shown in FIG. 1B, a general optical fiber laser type configuration is to connect a plurality of pump diodes 12 to a first pump coupler 13a and a second pump coupler 13b via optical fibers 120, respectively, and the first pump coupler 13a is connected to the second pump coupler 13b by an active optical fiber 130, so that the second pump coupler 13b outputs the laser light through an output optical fiber 14 (e.g., transmission direction Y shown in FIG. 1B).

When processing objects, it is most feared that the reflected light will be reflected back to the original optical path system along the laser optical axis. This situation is likely to cause damage to the laser system, especially the excitation source at the input end is most likely to be damaged by the reflected light, and the cost of the excitation source usually accounts for more than 50% of the overall cost of the laser machine.

However, in general laser machines, the light-collecting element can only be used to combine laser sources from multiple sources on a single optical fiber axis for transmission. Therefore, the output beam coupler 11 (or the first pump coupler 13a and the second pump coupler 13b) can only be used for light combining. An additional optical system (such as a reflected light detection optical path or an optical-fiber filter element) is required to perform the operation of determining the reflected light, so as to detect the reflected power at the laser output end, as a mechanism to protect the laser source.

As shown in FIG. 1A-2, in a general direct diode laser (DDL) type configuration, a cladding power stripper 15 and a splitter 16 are connected in sequence between the output beam coupler 11 and a laser head 1a by a transmission optical fiber 110, so as to partially split the reflected light by the splitter 16 (e.g., splitting path Z shown in FIG. 1A-2), and then to perform detection by a power meter 17.

Alternatively, as shown in FIG. 1A-3, in a general direct diode laser (DDL) type configuration, a first fiber-shell power filter 15a and a second fiber-shell power filter 15b are connected in sequence between the output beam coupler 11 and the laser head 1a by a transmission optical fiber 110. The pump light will escape from the first fiber-shell power filter 15a, and the second fiber-shell power filter 15b is used to capture the reflected light escaping to the fiber shell, and then the power meter 17 performs detection.

However, the general method of adding optical elements will reduce the transmission efficiency of the laser, increase the cost of the laser, and cannot accurately determine the amount of reflected light power actually reflected back to the emission source, resulting in misjudgment of the monitoring. For example, the addition of the fiber-shell power filter 15 and the beam splitter 16 shown in FIG. 1A-2 will cause part of the laser loss, and the alignment steps for adjusting the path are very complicated, which requires additional material costs and labor costs. Further, the addition of the first fiber-shell power filter 15a and the second fiber-shell power filter 15b shown in FIG. 1A-3 requires the provision of multiple filters and additional costs, and the proportion of light leakage will vary with the angle of the reflected light, which is likely to cause misjudgment.

Figure 2A:
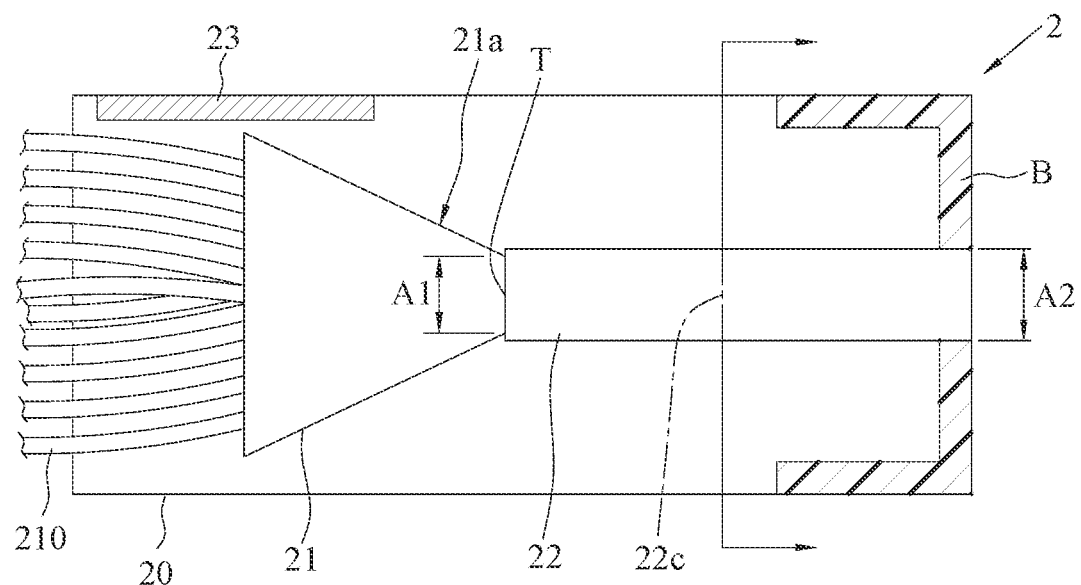
FIG. 2A is a schematic side perspective view of an optical fiber module according to the present disclosure.
Figures 1, 2B:
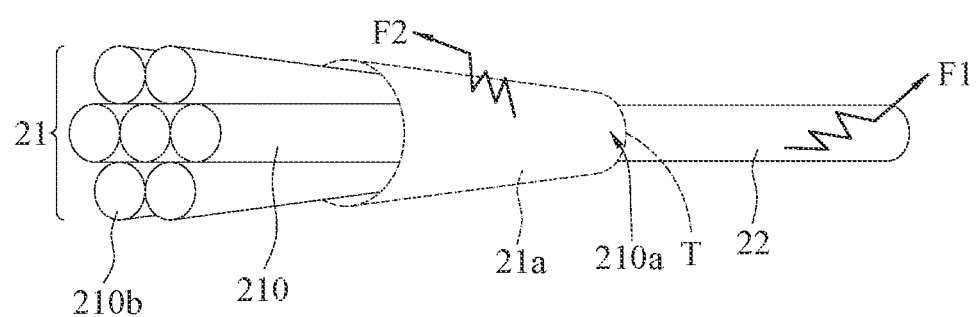
Figures 2, 2B:
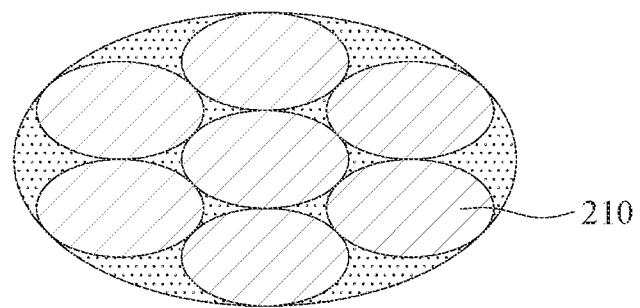
Figures 2, 2B, 3:
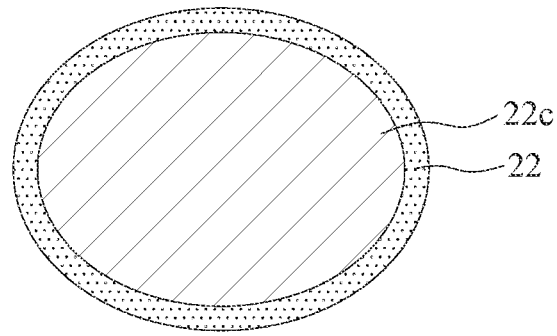

FIGS. 2A to 2D are schematic views of an optical fiber module 2 according to the present disclosure. As shown in FIGS. 2A to 2B-1, the optical fiber module 2 includes a plurality of first optical fibers 210, a second optical fiber 22, a housing 20 and a photoelectric sensor 23.

As shown in FIG. 2B-1, the plurality of first optical fibers 210 are collectively configured to form at least one optical fiber bundle 21 having a tapered end 21a. It should be noted that the tapered end 21a shown in FIGS. 2A to 2D is a schematic outline, and the tapered end 21a is a mask for covering the first optical fibers 210, and as the manufacturing method described later, the plurality of first optical fibers 210 use a fusion tapering method to form the optical fiber bundle 21 having the tapered end 21a.

In an embodiment, the plurality of first optical fibers 210 are used to receive a laser light source, and the first optical fibers 210 have opposite first ports 210a and second ports 210b, so that the first ports 210a of the plurality of first optical fibers 210 serve as the tapered top surface T of the tapered end 21a of the optical fiber bundle 21, and the second ports 210b are connected to a signal source like a laser source (not shown).

The second optical fiber 22 is connected to the tapered end 21a of the optical fiber bundle 21, and the optical fiber bundle 21 is converged to the second optical fiber 22 to form an optical fiber structure including the optical fiber bundle 21 and the second optical fiber 22.

In an embodiment, a first cross-sectional area A1 (as shown in FIG. 2A) of the tapered top surface T of the tapered end 21a of the optical fiber bundle 21 (as shown in FIG. 2B-2) and a second cross-sectional area A2 (as shown in FIG. 2A) of the cross section 22c of the second optical fiber 22 (as shown in FIG. 2B-3) are equal.

Figure 2C:
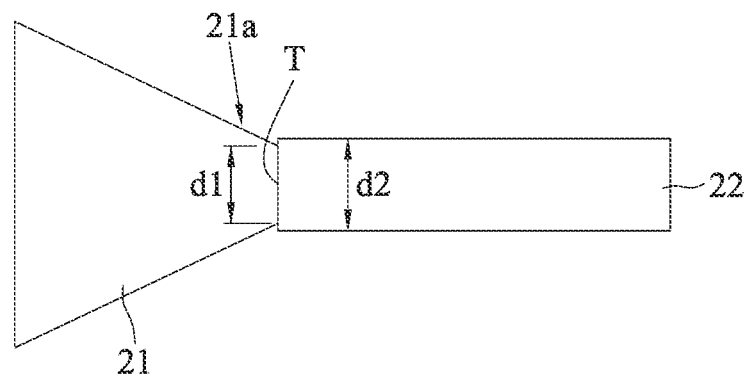
FIG. 2C is a schematic partial view of FIG. 2A.

Furthermore, a ratio D of the Mode Field Diameter (MFD) of the connection (or fusion splice) between a mode field diameter d1 of the tapered top surface T of the tapered end 21a of the optical fiber bundle 21 and a mode field diameter d2 of the second optical fiber 22 is 1±0.1, which is between 0.9 and 1.1 (such as 0.9<D<1.1). As shown in FIG. 2C, the ratio D of the mode field diameter d1 of the tapered top surface T of the tapered end 21a of the optical fiber bundle 21 to the mode field diameter d2 of the second optical fiber 22 is d1/d2.

Figure 2D:
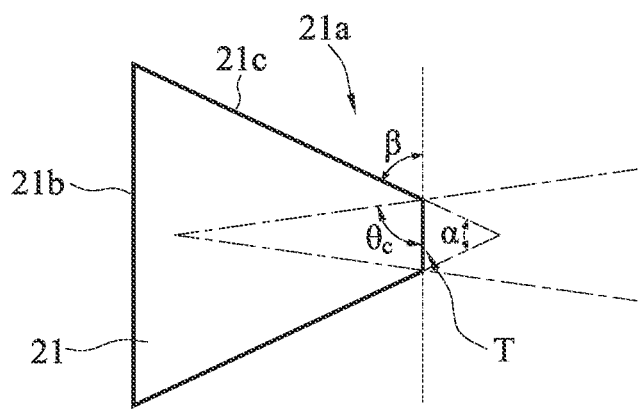
FIG. 2D is a schematic partial view of FIG. 2C.
Figure 3:
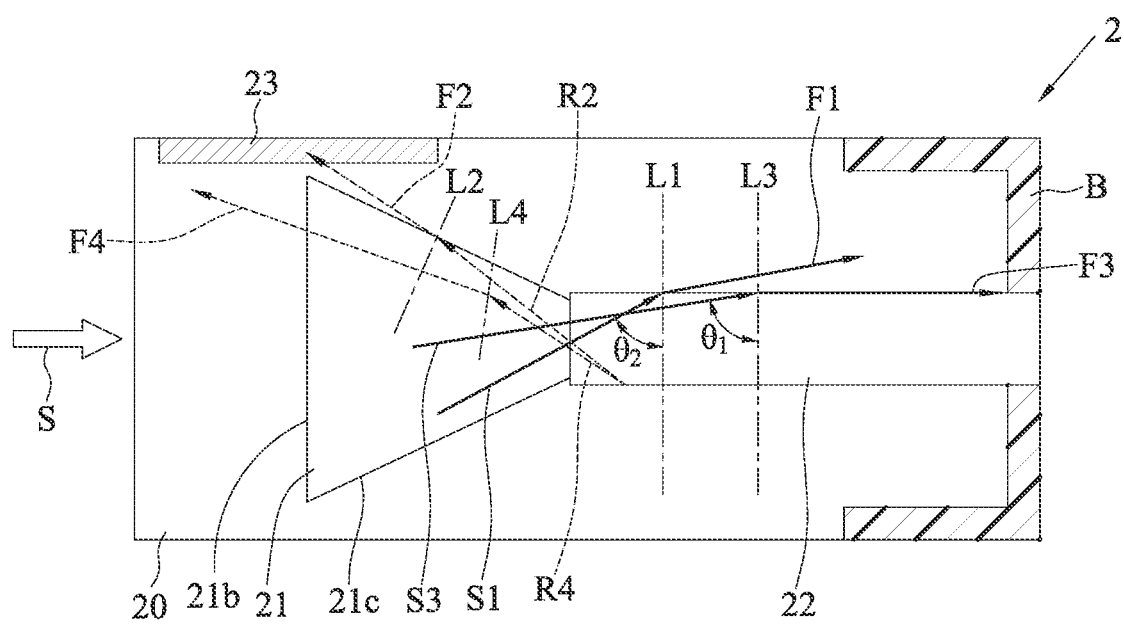

Please refer to FIG. 2D. A taper angle α of the optical fiber bundle 21 is referred to as the taper angle of the tapered end 21a (that is, the extension and intersection point of a tapered peripheral surface 21c), which is less than twice the light incident acceptable angle of the second optical fiber 22, which satisfies the following formula:

$$0<\alpha<2\times[90°-\theta_c]$$

where $\theta_c=\sin^{-1}(1/n)$, which represents the critical angle of light incident that satisfies the total reflection condition, and n is expressed as a refractive index of the first optical fiber 210 (which is the same as the refractive index of the second optical fiber 22), and where a critical angle of light incidence $\theta_C$ is a total reflection angle of light transmitted in the second optical fiber 22, and the acceptable angle is determined by the refractive index n of the first optical fiber 210 (that is, different refractive index n will have different acceptable angles).

Referring to FIG. 2A, the housing 20 accommodates the plurality of first optical fibers 210 and the second optical fiber 22, and has a light-absorbing area B corresponding to the end of the second optical fiber 22, so that the second optical fiber 22 is located between the optical fiber bundle 21 and the light-absorbing area B, so that the light-absorbing area B absorbs a scattering signal F1 escaped and scattered when signals are transmitted from the plurality of first optical fibers 210 to the second optical fiber 22 (as shown in FIG. 3).

In an embodiment, the light-absorbing area B is made of black material, such as black anode aluminum, to facilitate the absorption of the scattering signal F1. For example, the light-absorbing area B is arranged on the housing 20 in front of the end of the second optical fiber 22 and extends to the housing 20 around the end to present a mask shape.

The photoelectric sensor 23 is configured corresponding to the plurality of first optical fibers 210 and is provided in the housing 20 to receive a target signal F2 escaped and refracted when the signals are transmitted from the second optical fiber 22 to the plurality of first optical fibers 210 (as shown in FIG. 3).

In an embodiment, the photoelectric sensor 23 is arranged corresponding to a tapered bottom 21b of the optical fiber bundle 21. For example, the photoelectric sensor 23 is arranged outside the tapered bottom 21b of the optical fiber bundle 21 (such as the oblique rear of the tapered top surface T, which is roughly along the tapered peripheral surface 21c toward the direction of the tapered bottom 21b and intersects with the extended imaginary line of the tapered peripheral surface 21c), and its position relative to the optical fiber bundle 21 satisfies the following formula:

$$0<\beta<2\times[90°-(\alpha/2)]$$

where, as shown in FIG. 2D, β is expressed as an angle between the tapered top surface T of the tapered end 21a (e.g., extended dashed line as shown in FIG. 2D) and the tapered peripheral surface 21c, so that an extended imaginary line of the tapered peripheral surface 21c passes through the photoelectric sensor 23.

Please also refer to FIG. 3 together. During the operation of the optical fiber module 2, an optical signal S (such as a laser signal) enters the second optical fiber 22 from the second ports 210b of the first optical fibers 210 through the first port 210a, so as to be transmitted to the required place by the second optical fiber 22.

In an embodiment, since the plurality of first optical fibers 210 form the optical fiber bundle 21 having the tapered end 21a, the optical signals S will enter the second optical fiber 22 at various incident angles. For instance, a light incident angle θ1 of the first optical fiber 210 satisfies a critical light incident angle $\theta_C$ of the total reflection condition (for example, the transmission path S3 of the incident light is free from being parallel to the tapered peripheral surface 21c), and the light incident angle θ1 is an angle between the transmission path S3 of the incident light and a normal line L3, that is, $\theta1=\theta_C$, and the transmitted optical signal F3 will be completely transmitted (along the surface of the second optical fiber 22) without escaping the second optical fiber 22. In addition, when a light incident angle θ2 of the first optical fiber 210 is less than the critical light incident angle $\theta_C$ (for example, the transmission path S1 of the incident light is parallel to the tapered peripheral surface 21c), and the light incident angle θ2 is an angle between the transmission path S1 of the incident light and the normal line L1, the transmitted light signal will generate a scattering signal F1 at the second optical fiber 22 due to refraction (such as the normal line L1 of the surface of the second optical fiber 22), and the scattering signal F1 is absorbed by the light-absorbing area B.

After the light is outputted from the second optical fiber 22, it hits a highly reflective material (for example, a metal material/optical fiber material, but not limited to this), and thus reflects back to the second optical fiber 22 to generate reflected light R2, R4. Therefore, the reflected light R2, R4 will be refracted when passing through the optical fiber bundle 21, so as to escape from the different parts of the tapered peripheral surface 21c of the optical fiber bundle 21. The reflected light R2, R4 may be located on different first optical fibers 210, as the target signals F2, F4 shown in FIG. 3, so that the photoelectric sensor 23 receives the target signals F2, F4. It should be understood that the reflected light R2, R4 escape to the outside of the first optical fibers 210 according to the refractive index n of the first optical fibers 210, where tube walls of the first optical fibers 210 define normal lines L2, L4, to present the linear path of the reflected light R2, R4 in the optical fiber bundle 21 (such as a refraction manner).

Therefore, the optical fiber bundle 21 according to the present disclosure can be used to change the taper angle of the tapered end 21a, so that the scattering signal F1 of the incident light has an independent propagation direction.

Furthermore, the geometric structure mismatch of the optical fiber bundle 21 is used to make the target signals F2, F4 of the reflected light R2, R4 have independent propagation directions, and the photoelectric sensor 23 is arranged on the scattering path thereof to detect the target signals F2, F4. In one embodiment, the photoelectric sensor 23 is located on an extended tangent line of the tapered peripheral surface 21c, and the surface of the photoelectric sensor 23 intersects the extended imaginary line.

Furthermore, the light-absorbing area B is arranged on the scattering path of the scattering signal F1 of the incident light, so as to facilitate the absorption of the scattering signal F1 generated by the optical signal S.

Figure 4:
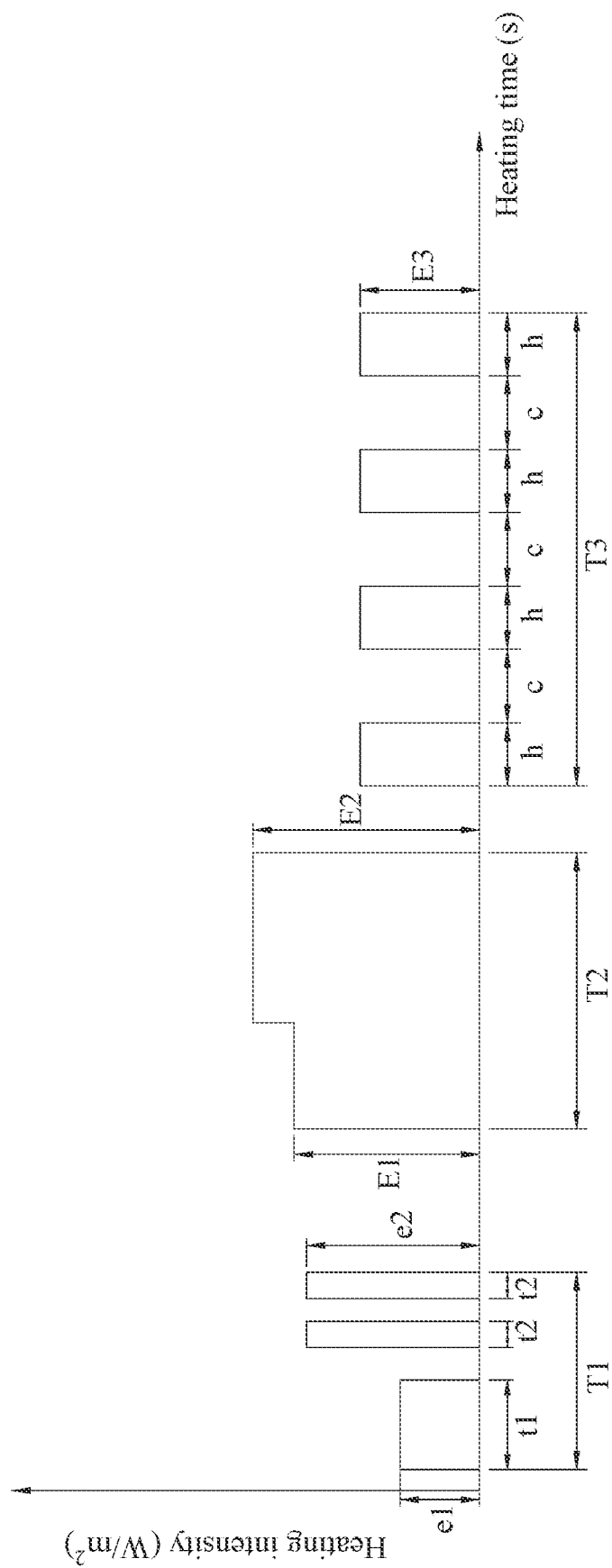
FIG. 4 is a schematic diagram of a thermal response of a manufacturing method of an optical fiber module according to the present disclosure during the production of the optical fiber bundle.

FIG. 4 is a schematic diagram of a thermal response of the manufacturing method of the optical fiber module 2 according to the present disclosure when the optical fiber bundle 21 is made. In an embodiment, the optical fiber is made of glass material, and the optical fiber bundle 21 adopts a special asymmetric heating method to control the taper angle of the first optical fibers 210 for merging, and the optical fiber bundle 21 is fused to a second optical fiber 22 as an output.

As shown in FIG. 4, the horizontal axis represents the heating time (in seconds), and the vertical axis represents the surface heating intensity (that is, heat flux or heat flow rate), and its unit is watts per square meter (W/m$^2$).

First, the plurality of first optical fibers 210 are bundled, and then the optical fiber fusion splicer is used to perform the pre-cleaning discharge modulation operation to clean the surface of the plurality of first optical fibers 210 (such as glass dust), as a first time period T1 shown in FIG. 4, so as to clean up through different heating intensities.

In an embodiment, the glass dust on the surface of the first optical fiber 210 can be slowly (a first cleaning time course t1 shown in FIG. 4) cleaned with a weaker heating intensity (a cleaning energy e1 shown in FIG. 4), and then the glass dust can be quickly hit (a second cleaning time course t2 shown in FIG. 4, the second cleaning time course t2 is less than the first cleaning time course t1, and the second cleaning time course t2 is a short pulse) on a local surface of the first optical fiber 210 with a stronger heating intensity (a cleaning energy e2 shown in FIG. 4). It should be understood that the main material of the optical fiber is glass, but the required materials can be added as required to form a variety of composite materials. Therefore, when performing the pre-cleaning discharge modulation operation, the required heating intensity and cleaning time course are coordinated with the structure adjustment of the composite material, and are not limited to the relative relationship in FIG. 4.

Next, a medium energy is used to perform high and low discharge operations to generate step discharge (a second time period T2 as shown in FIG. 4), which softens the glass material and melts the plurality of first optical fibers 210, and then swings and tapers the fused plurality of first optical fibers 210 to stabilize the passive first optical fibers 210 in the process, whereby the fused plurality of first optical fibers 210 are tapered and swung to form an optical fiber bundle 21 having a tapered end 21a.

In an embodiment, the step discharge includes a first energy E1 and a second energy E2. As shown in FIG. 4, the second energy E2 is greater than the first energy E1, and the occurrence time of the first energy E1 is earlier than the occurrence time of the second energy E2, wherein the first energy E1 and the second energy E2 are continuous. For example, the first energy E1 is greater than the cleaning energies e1, e2 of the first time period T1. It should be understood that there are many types of composite materials of the optical fiber, so the relative relationship (strong or weak) between the first energy E1 and the cleaning energy in the first time period T1 is not limited to the above.

Next, a high-energy system is used to perform phased discharge to generate periodic discharge (a third time period T3 as shown in FIG. 4) to improve or strengthen the structural strength of the tapered optical fiber bundle 21, especially for the structure of thinner parts.

In an embodiment, the heating manner of the third time period T3 adopts a heating and cooling alternate manner, such as annealing, to strengthen the structural strength of the optical fiber bundle 21. For example, the third time period T3 is divided into four heating courses h and three cooling courses c, and the heating intensity of the heating course h is defined as a third energy E3, which is less than the first energy E1. It should be understood that there are many types of composite materials for the optical fiber, so the heating intensity and heating and cooling time courses required for the third time period T3 can be coordinated with the structure adjustment of the composite material, and are not limited to the relative relationship and the number of heating and cooling times in FIG. 4, and the relative relationship (strong or weak) between the third energy E3 and the energy of the second time period T2 is not limited to the above.

Furthermore, a cleave manner is used to remove excess parts of the plurality of first optical fibers 210, so as to obtain the optical fiber bundle 21.

After that, the second optical fiber 22 is connected to the tapered end 21a of the optical fiber bundle 21 in a splice manner such as fusion, and then the optical fiber bundle 21 and the second optical fiber 22 are housed/accommodated together in a housing 20, and the light-absorbing area B and the photoelectric sensor 23 are arranged in the housing 20.

Therefore, the manufacturing method of the optical fiber module according to the present disclosure is to weld the second optical fiber 22 and the optical fiber bundle 21 by heating to form an asymmetrical shape (tapered optical fiber bundle 21 and single second optical fiber 22) by the asymmetry of the intensity of the discharge and the time course (as shown in FIG. 4, the cleaning energy e1 of the first cleaning time course t1 is different from the cleaning energy e2 of the second cleaning time course t2). The mismatch and angle change of the opposite sides of the optical fiber geometry structure at the welded location make the scattering signal F1 of the incident light and the target signals F2, F4 of the reflected light have a specific propagation direction, and the photoelectric sensor 23 is arranged on the transmission path of the reverse scattering signals (that is, the target signals F2, F4) to detect the reflected power. It should be understood that the asymmetric heating manner is to bring a plurality of first optical fibers 210 together in a molten state to be tapered, and close the first optical fibers 210 to expand the propagation field toward the second optical fiber 22, so that an effective power coupling occurs in the region of the extremely short tapered end 21a.

In summary, the optical fiber module 2 according to the present disclosure and manufacturing method thereof are achieved by integrating the photoelectric sensor 23 and the optical fiber structure (that is, the optical fiber bundle 21 and the second optical fiber 22) in a housing 20, to form a laser light-collecting element (that is, the optical fiber module 2) with a built-in reflected power detection function (that is, the photoelectric sensor 23). As such, the optical fiber module 2 according to the present disclosure not only has the performance of multi-beam laser light combining, but also can simultaneously capture and detect the reflected power signal inside. Therefore, the optical fiber module 2 according to the present disclosure can be installed at the laser source of a laser machine to directly detect the value of the reflected power, so that the value of the reflected power encountered by the laser source can be accurately determined, which can be used as a protection mechanism for the laser source to distinguish, so as to achieve the purpose of a single optical element (that is, the optical fiber nodule 2) with the laser beam combining performance and the reflected power detection function.

The foregoing embodiments are used for the purpose of illustrating the principles and effects only rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. An optical fiber module, comprising:
    a plurality of first optical fibers collectively arranged to form at least one optical fiber bundle with a tapered end;

a second optical fiber connected to the tapered end of the optical fiber bundle to converge the optical fiber bundle to the second optical fiber;

a housing accommodating the optical fiber bundle with the tapered end and the second optical fiber and having a light-absorbing area corresponding to an end of the second optical fiber, wherein the second optical fiber is located between the optical fiber bundle and the light-absorbing area, and the light-absorbing area absorbs scattering signals escaped and scattered when signals are transmitted from the plurality of first optical fibers to the second optical fiber; and a photoelectric sensor configured corresponding to the optical fiber bundle with the tapered end and arranged in the housing, wherein the photoelectric sensor receives target signals escaped and refracted when the signals are transmitted from the second optical fiber to the plurality of first optical fibers, wherein a taper angle of the optical fiber bundle is less than twice a light incident acceptable angle of the second optical fiber, which satisfies a following formula:

$$0<\alpha<2\times[90°-\theta_c]$$

wherein $\theta_c=\sin^{-1}(1/n)$, $\theta_c$ represents a critical angle of light incidence satisfying a total reflection condition, and n is expressed as a refractive index of the first optical fibers, $\alpha$ is the taper angle, such that the critical angle of the light incidence is a total reflection angle of light transmitted in the second optical fiber.

2. The optical fiber module of claim 1, wherein the plurality of first optical fibers are used to receive light from a laser light source.

3. The optical fiber module of claim 1, wherein a first cross-sectional area of a tapered top surface of the tapered end of the optical fiber bundle is equal to a second cross-sectional area of a cross-sectional surface of the second optical fiber.

4. The optical fiber module of claim 1, wherein the first optical fibers have opposite first ports and second ports, such that the first ports of the plurality of first optical fibers serve as the tapered end of the optical fiber bundle, and the photoelectric sensor is arranged corresponding to a tapered bottom of the tapered end of the optical fiber bundle, such that an extended imaginary line of a tapered peripheral surface of the tapered end of the optical fiber bundle passes through the photoelectric sensor.

5. The optical fiber module of claim 1, wherein a ratio of a mode field diameter of a connection between a diameter of a tapered top surface of the tapered end of the optical fiber bundle and a diameter of the second optical fiber is between 0.9 and 1.1.

6. The optical fiber module of claim 1, wherein the position of the photoelectric sensor relative to the optical fiber bundle satisfies a following formula:

$$0<\beta<2\times[90°-(\alpha/2)]$$

wherein $\beta$ is expressed as an angle between a tapered top surface and a tapered peripheral surface of the tapered end, such that an extended imaginary line of the tapered peripheral surface passes through the photoelectric sensor.

* * * * *